UNITED STATES PATENT OFFICE.

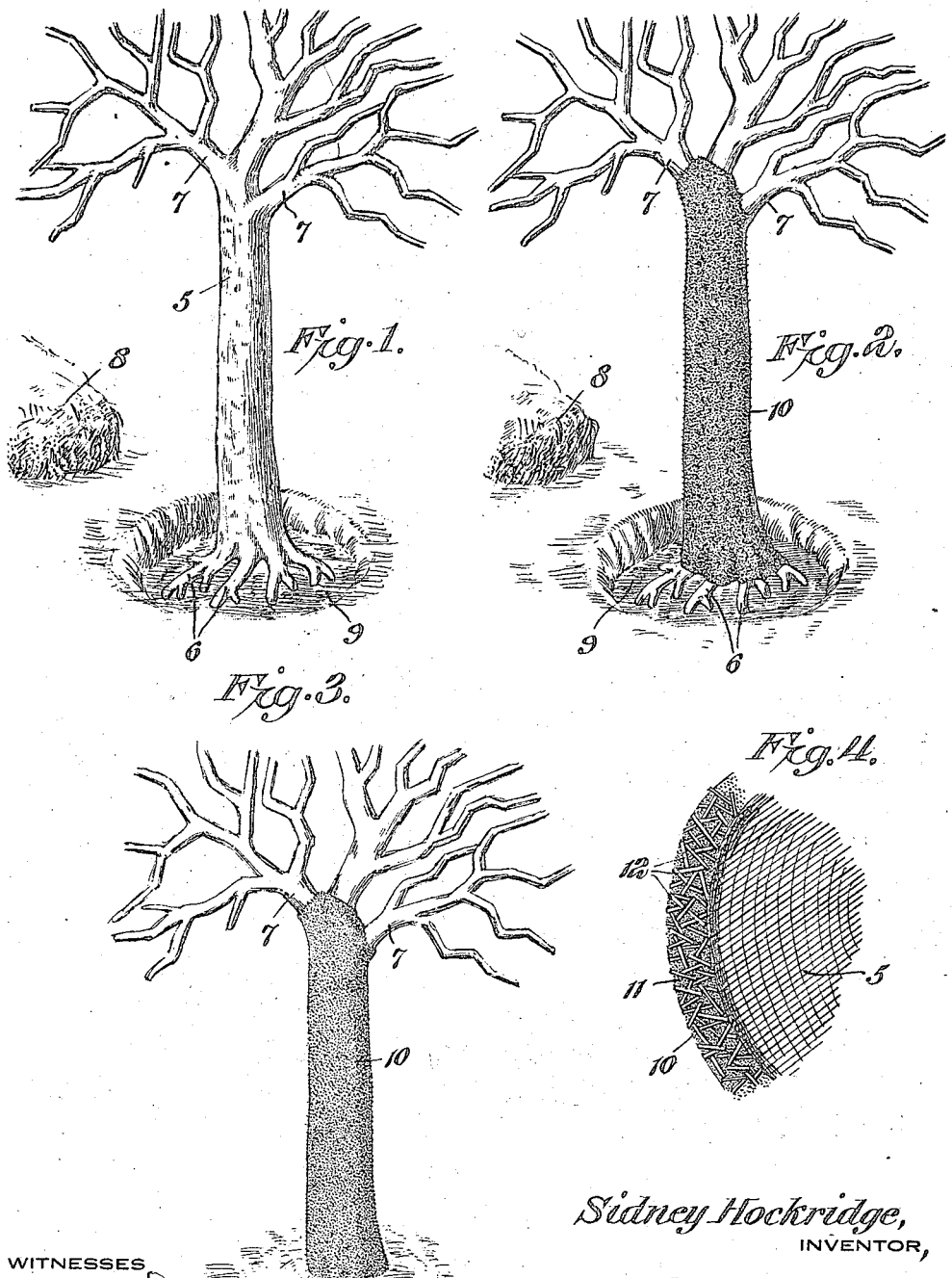

SIDNEY HOCKRIDGE, OF REDLANDS, CALIFORNIA.

METHOD AND MEANS FOR PROTECTING TREES.

1,425,257.　　　　　Specification of Letters Patent.　　Patented Aug. 8, 1922.

Application filed January 7, 1919. Serial No. 269,979.

*To all whom it may concern:*

Be it known that I, SIDNEY HOCKRIDGE, a citizen of the United States, residing at Redlands, in the county of San Bernardino and State of California, have invented certain new and useful Improvements in Methods and Means for Protecting Trees, of which the following is a specification.

This invention relates to a method and means for protecting trees, particularly fruit trees, from various diseases, blights, and the ravages of certain animals and insects.

Studies in plant physiology and pathology in conjunction with practical experimental work conducted over a period of years, indicate that certain obscure diseases which attack fruit trees arise from cold and hot winds striking the naked trunks of trees at or near the ground, the effect being to interrupt osmotic action, and to cause congestion of sap with consequent exudations to the surface. This effect, called "gumosis" or "gumming", occurs especially in citrus species as the orange and lemon trees, and also in the stone fruit trees, such as cherry, peach, plum and apricot. It is thought that apple and pear blights also arise from these or similar causes.

The principal object of this invention is to provide a tree covering which will prevent damage from flux through the bark, called "gumosis", or the diseases known as die back and scaly bark, as well as apple and pear blight.

Other objects are to provide a coat or jacket which will protect the tree against the smaller animals, the borers and other insects, and in general from abrasion or other mechanical injury.

The objects just recited, as well as others not mentioned, are best obtained by the use of such a tree jacket as is described below, reference being had to the accompanying drawings, wherein—

Figure 1 is a perspective view of a tree showing the earth removed from around its base, and as far down as its crown roots;

Figure 2 is a similar view showing the tree jacket in place;

Figure 3 is a like view showing the tree with its jacket after the removed earth has been replaced; and Figure 4 is a fragmentary and greatly enlarged cross-sectional view through a portion of a tree and its jacket.

The numeral 5 indicates the trunk of the tree, 6 the crown roots, and 7 the main forks or branches. 8 is the pile of earth which has been removed from around the base of the tree, and 9 is the excavation or hole left by such earth, which hole lays bare the crown roots 6, as plainly seen.

The numeral 10 indicates the jacket proper which extends from the crown roots to a point at least eighteen inches above the ground, and preferably is run up as high as the main branches 7, as the drawing depicts. This jacket or coat is a homogeneous mixture of plaster of Paris 11 and chopped fibrous material 12, (see Fig. 4). Any form of fibrous material may be employed, but straw because of its cheapness, its ready availability and other reasons, is preferred. Instead of plaster of Paris, clay or any other air hardening or setting binding material having the same chemical and mechanical action and not containing oil or lime may be used; but the former has been found by experiment to be superior to all other, because it is harmless to the trees and is amply resistant to the influences of the weather.

When I desire to apply my jacket to a tree, I remove the earth as illustrated in Figure 1, thus exposing the crown roots. Then I take equal parts by volume of commercial plaster of Paris and of straw, chopped to a fineness of a quarter of an inch. These are intimately mixed in the dry state. When desired to be used, I add just enough water to make a plaster that can be easily worked, and apply the mixture directly to the trunk of the tree. I may employ a trowel or the like in building the jacket on the tree; but in any case I keep the thickness of the jacket down to one-half an inch for large trees, and less than that for smaller trees. The coating is applied either as a half jacket or full jacket. I have disclosed what I term a full jacket in the drawing; a half jacket extends from the crown roots up to a point about eighteen inches above the normal surface of the ground.

With a view of adding durability to the jackets, there may be applied thereto a coating of linseed oil or common paint, but this is not essential.

The jacket "sets" firmly in place around the trunk and forms a light, tough, strong, and cheap protection for the tree; one which is highly permeable to air, which will not conduct heat and hence will shield from cold as well as hot blasts, which will not crack nor fall off under the strains set up by the slight motion of the trunk, and which will not be affected by the heaviest and most prolonged rains. Such a jacket will also keep away small animals, borers and many other insects, and will serve as an efficient protector against mechanical injury.

That portion of the jacket which extends under ground obviously is not subject to decay and will last as long, or even longer than the part exposed to the elements.

Instead of straw, hay, jute, flax, or other fibrous material may be used, whether of vegetable, animal or mineral origin. I do not wish to confine myself to any particular material, nor to any particular degree of fineness into which the same is to be chopped. Experiment has shown that straw chopped into quarter inch lengths gives the best results, hence I have particularly specified the same. Nor do I wish to be limited to any particular thickness of jacket, nor to any special length thereof. As long as the jacket reaches from the crown roots to a point substantially eighteen inches above the ground, protection is afforded the tree; but, of course, better protection is rendered by a jacket extending as high as the main branches.

So far as I am aware, I am the first to apply a plastic composition directly to the tree trunk to form a self-adhering and self-sustaining coat or jacket, and which has the characteristics and advantages hereinbefore fully specified.

What I claim is—

1. That method of protecting trees which consists in digging away the earth at the foot of the tree to expose the crown roots, applying a jacket of air hardening material directly upon the trunk of the tree down as far as the crown roots, and replacing the earth previously removed.

2. That method of protecting trees which consists in mixing plaster of Paris and chopped straw with water so as to form an adherent, air-hardening composition, and plastering the trunk of the tree with said composition.

3. That method of protecting trees which consists in removing the earth from above the crown roots so as to expose the latter, mixing an air-hardening plaster-like composition, plastering the trunk of the tree from the crown roots to the first forks, and replacing the earth.

4. A jacket for protecting trees against weather changes, vermin and mechanical injury, comprising a plaster-like mass applied to and sustained wholly by the trunk of the tree, said jacket extending from the crown roots of the tree to a point at least one foot above the ground.

5. A jacket for protecting trees against weather changes, vermin and mechanical injury, comprising a plaster-like mass sustained wholly by the trunk of the tree, said jacket being of sufficient elasticity to permit slight movements of the trunk without cracking and falling off the trunk, and extending from the crown roots of the tree to a point at least one foot above the ground.

6. A jacket for protecting trees against weather changes, vermin and mechanical injury, comprising a plaster-like mass sustained wholly by the trunk of the tree, said jacket being permeable to air and a heat insulator and of sufficient elasticity to permit slight movements of the trunk without cracking and falling off the trunk; said jacket extending from the crown roots of the tree to a point at least one foot above the ground.

In testimony whereof I affix my signature.

SIDNEY HOCKRIDGE.